(No Model.)
C. E. VAIL.
CARRIAGE FOR BICYCLE SADDLES.
No. 577,084. Patented Feb. 16, 1897.
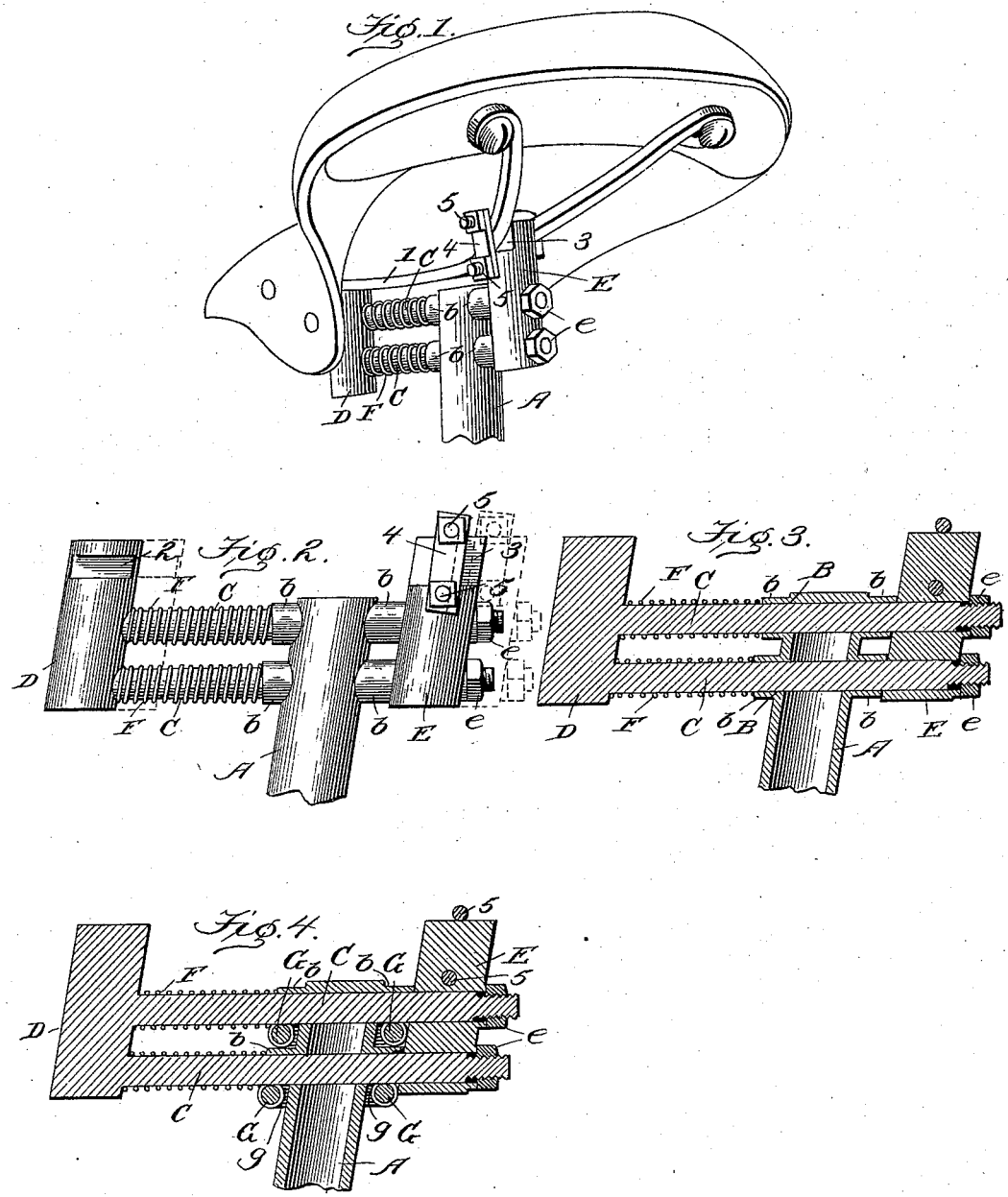
WITNESSES:
Edwin L. Bradford
Chas. W. Boyle
INVENTOR
Chas. E. Vail,
BY
[signature],
ATTORNEY.

UNITED STATES PATENT OFFICE.

CHARLES E. VAIL, OF SALT LAKE CITY, UTAH.

CARRIAGE FOR BICYCLE-SADDLES.

SPECIFICATION forming part of Letters Patent No. 577,084, dated February 16, 1897.

Application filed July 26, 1895. Serial No. 557,224. (No model.)

*To all whom it may concern:*

Be it known that I, CHARLES E. VAIL, a citizen of the United States, residing at Salt Lake City, in the county of Salt Lake and Territory of Utah, have invented certain new and useful Improvements in Carriages for Bicycle-Saddles, of which the following is a specification.

This invention relates to carriages for bicycle-saddles; and it has for its object to provide an improved device of this character which will automatically operate to relieve the bicycle from strain in passing over rough surfaces and to insure a more comfortable and secure seat to the rider.

In the drawings, Figure 1 is a perspective view of a bicycle-saddle and saddle-post, illustrating the application of my invention. Fig. 2 is a side elevation of the saddle-carriage, the movement being illustrated in dotted lines. Fig. 3 is a vertical longitudinal sectional view of the same. Fig. 4 is a similar view illustrating a modification.

Corresponding parts in all the figures are denoted by the same letters and numerals of reference.

Referring to the drawings, A designates an upright saddle-post, which may be in the main of any suitable or preferred construction, and is provided near its upper end with two parallel approximately horizontal bearing-channels B B, located one directly above the other and transversely relative to the post. Saddle-posts being generally of tubular construction, these channels are preferably formed by providing the post at its front and rear sides with coincident sleeves $b$ $b$.

Working within the channels B B are two parallel rods C C, rigidly coupled at their forward ends by a head D. Mounted upon the distal ends of the rods C, in rear of the post, is a block E, held thereon by nuts $e$ $e$.

The rods C are designed to play within their bearing-channels, and in order to carry out the function for which the device is designed coil-springs F F are provided, said springs being disposed, respectively, upon the rods C between the post and the head D, the tension of said springs being exerted to normally retain the rods in a forward position.

The means for attaching the saddle to the carriage may be adapted to the construction of saddle used in connection therewith. In the drawings, however, I have illustrated the attachment of one form of saddle in which the spring 1 has its forward looped end fitted in recesses 2 2 in the sides of the head D, the rear arms of the spring being received by the recesses 3 3 in the block E and secured therein by washers 4 4 and bolts 5 5.

The operation and advantages of my invention will be readily understood by those skilled in the art to which it appertains. Normally the saddle and carriage are held in a forward position by the springs F, such forward position being to the rear of a vertical line taken through the pedal-shaft. Thus when the bicycle is in use all power applied to the pedals to propel the same is exerted forward of the saddle, whereby a rearward pressure is exerted upon the latter, causing it to yield rearwardly. When the speed of the bicycle is momentarily slackened by contact of the latter with some obstruction, the saddle "gives" forwardly, and thereby relieves both the bicycle and rider from the shock and concussion which would necessarily take place were the saddle incapable of a forward movement.

From the foregoing it will be obvious that the saddle-carriage is capable of longitudinal movement in an approximately horizontal plane, such movement being controlled by the spring in such manner as to compensate for the jolting and jarring incident to the passage of the bicycle over rough surfaces or obstructions.

I do not wish to be understood as limiting myself to the precise construction above described, as numerous modifications may be made without departing from the spirit and scope of my invention. For example, roller-bearings G for the sliding rods may be provided, said bearings being journaled under the respective sleeves $b$ and projecting through a slot $g$ therein, the rods C working upon the rollers.

I claim as my invention—

As an improvement in bicycle-saddle carriages, the combination, with a rigid member provided with parallel bearing-channels, of the carriage consisting of yielding bearing-rods working in said channels in a straight, longitudinal line relative thereto, said rods being rigidly connected at their forward ends, a block rigidly connecting the rear ends of said yielding rods and provided with means for mounting the saddle directly and rigidly thereon, and a coil-spring disposed on each of said rods in front of the rigid member; substantially as set forth.

In testimony whereof I affix my signature in presence of two witnesses.

CHARLES E. VAIL.

Witnesses:
H. S. McCALLUM,
A. L. HOPPAUGH.